Jan. 12, 1960 A. C. SAMPIETRO 2,920,574
MOTOR-PUMP UNIT AND METHOD OF MAKING SAME
Filed Jan. 23, 1956 2 Sheets-Sheet 1
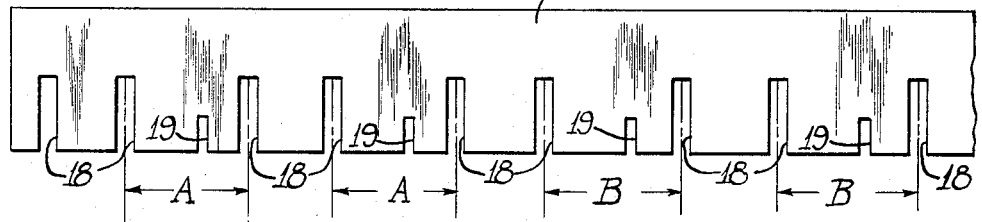
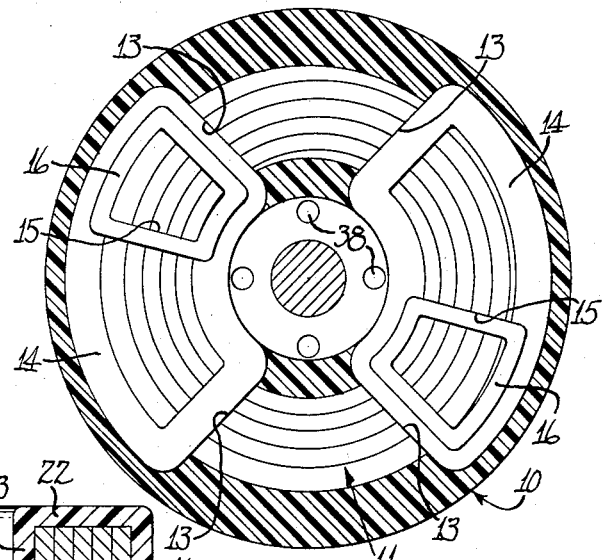
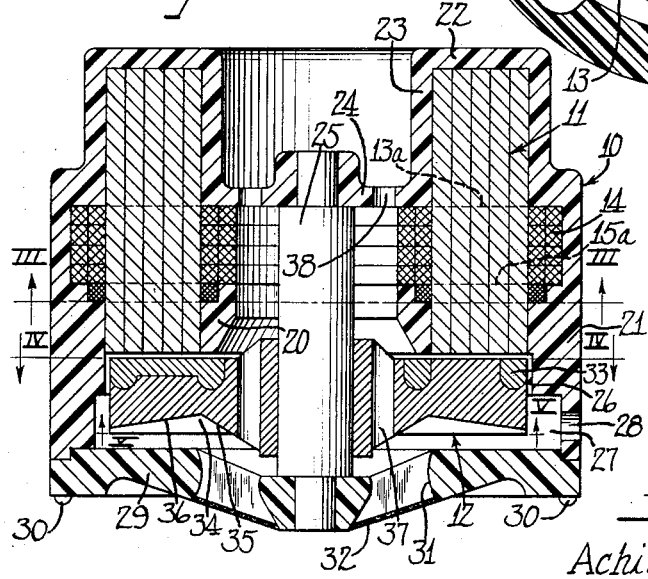
Inventor
Achilles Charles Sampietro
by Hill Sherman Meroni Gross & Simpson
Attys

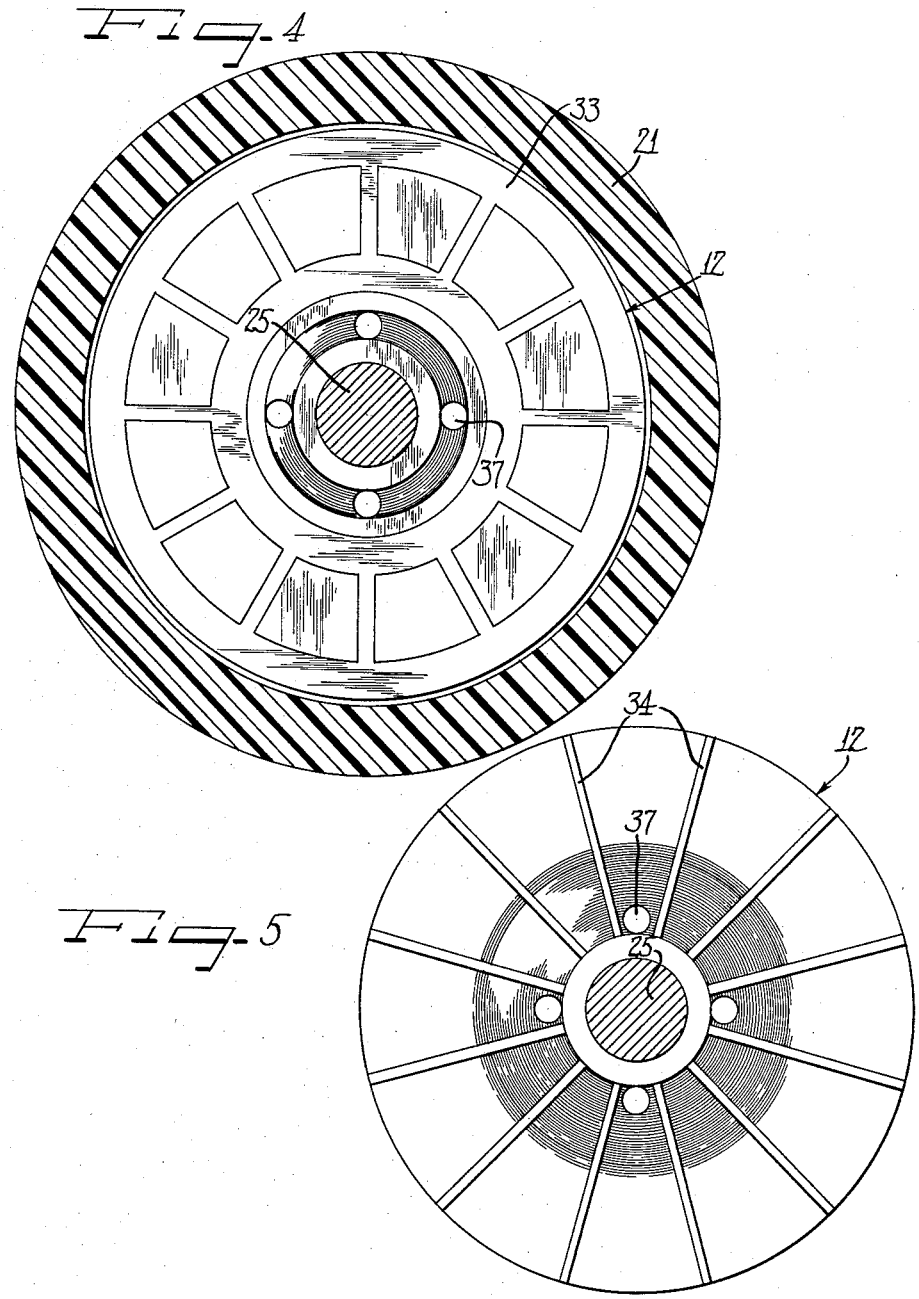

United States Patent Office 2,920,574
Patented Jan. 12, 1960

2,920,574
MOTOR-PUMP UNIT AND METHOD OF MAKING SAME

Achilles Charles Sampietro, Detroit, Mich., assignor to Thompson Ramo Wooldridge Inc., a corporation of Ohio Application January 23, 1956, Serial No. 560,673

3 Claims. (Cl. 103—87)

The present invention relates generally to an improved motor-pump unit and method of making the same, and more particularly to a motor-pump unit of small and compact size that may be immersed in the liquid which it handles. This unit is highly desirable for installation in fuel tanks of vehicles powered by internal combustion engines or the like, wherein vapor locking tendencies in the pump are completely eliminated, although other uses and purposes of this invention may be appreciated by one skilled in this art.

In the present invention, the stator core of the motor is formed by spirally winding a length of steel ribbon that has been notched along one edge and heat treated to restore magnetic properties lost in the notching operation. When the ribbon has been wound, the stator core will be formed, and due to the spacing of the notches, the notches will align to define radial coil receiving slots. After the coils or windings have been inserted in the slot of the stator, a housing is molded around the stator leaving the slotted end of the stator open. An impeller-rotor is disposed in opposed relationship to the slotted end of the stator, thereby providing an axial gap type motor and a shaft is employed for rotatably mounting the impeller-rotor in the housing. One end of the shaft is rotatably carried in an aperture formed in the corresponding end of the housing, while a cover member is secured to the other end of the housing having an aperture for receiving the other end of the shaft and openings to the impeller. A series of holes is provided near the center of the rotor to vent vapor upward along the rotor and through a second series of holes in the other end of the housing. In the area of the impeller, the housing is formed to define a volute chamber, along which a pump outlet is positioned.

By operating the motor-pump unit of the present invention immersed in the liquid it handles, a cooling effect is had on the unit which reduces ohmic losses generated in electrical machinery operated at elevated temperatures. Furthermore, this affords a design of the windings at a much higher current density with a resulting reduction in space requirements of the windings and a better magnetic circuit.

Accordingly, it is an object of this invention to provide an improved motor-pump unit that is compact and small in size, and which is provided with a molded plastic casing thereby further adding to its lightness.

Another object of this invention is to provide a motor-pump unit adapted to be operated while it is immersed in the liquid which it handles that is constructed to automatically remove vapor from the unit.

A still further object of this invention resides in the provision of a method for making a motor-pump unit, and especially a method of making the stator core of the motor.

Another object of this invention is in the provision of a method of fabricating a stator core of an induction motor including the formation of notches along one edge of a steel ribbon that are spaced from one end progressively further apart, heat treating the steel ribbon to restore magnetic properties lost in the notch forming operation, and spirally winding the steel ribbon to form the stator core, wherein the notches align to define radial core receiving slots in the finished core.

A further feature of the invention is when constructing the motor, any seal or plate between the rotor and stator is eliminated, thereby allowing the impelling fluid to be in full communication with the rotor and stator.

It is then an object of this invention to provide a motor-pump unit having an electric motor of the axial gap type, wherein the usual seal or plate between the rotor and stator is eliminated thereby allowing the impelling fluid to be in full communication with these elements, wherein the cooling and efficiency of the motor is enhanced.

Another object of this invention resides in the provision of an induction type motor of the axial gap type that does not have any seal or plate between the rotor and stator, wherein closer spacing of the rotor and stator is permitted which increases the efficiency of the motor.

Further, in the present invention, the rotor and impeller is constructed as a combined unit, wherein blades or vanes are formed on one side of a disk to allow the disk to function as an impeller, while a squirrel cage is formed on the other side of the disk to allow it to function as a rotor of the motor. The impeller-rotor is constructed in such a manner that the hydraulic pull of the impeller substantially balances the magnetic pull of the rotor portion.

Therefore, it is also an object of this invention to provide a motor-pump unit having an axial gap type motor with a unitary rotor-impeller constructed so that the hydraulic pull of the impeller portion substantially balances the magnetic pull of the rotor portion, wherein the rotor-impeller is more or less allowed to ride free in a floatingly manner thereby eliminating the necessity for providing a heavy bearing arrangement to support the rotor-impeller shaft and reducing the size and weight of the unit.

Other objects, features, and advantages of the invention will be apparent from the following detailed disclosure, taken in conjunction with the accompanying sheets of drawings, wherein like reference numerals refer to like parts, in which—

On the drawings:

Figure 1 is a fragmentary reduced elevational view of a punched metal strip or ribbon used for making a stator core for an electric motor in accordance with the principles of the invention;

Figure 2 is an axial sectional view, with some parts in elevation, of the motor-pump unit of the present invention;

Figure 3 is a transverse sectional view taken through the motor-pump unit of Figure 2 and substantially along line III—III and looking in the direction of the arrows;

Figure 4 is a transverse sectional view taken substantially along line IV—IV in Figure 2 and looking in the direction of the arrows, and illustrating the rotor of the motor in plan view; and Figure 5 is a plan view of the impeller portion of the rotor-impeller of the present invention taken substantially along line V—V of Figure 2 and looking in the direction of the arrows.

As shown on the drawings:

As seen in Figure 2, the motor-pump unit of the present invention is comprised of an induction motor of the axial gap type and a centrifugal pump enclosed in a common housing or casing 10. In general, the unit includes a stator 11 and an impeller-rotor 12. While the drawings illustrate a two pole, single phase motor, it is to be understood that any number of poles and phases could be employed to suit other conditions.

Referring now to Figures 2 and 3, a stator 11 is formed in the shape of a hollow cylinder or annulus having angularly displaced radial slots 13 for receiving primary or main windings or coils 14. These slots are open at one end of the stator, and are of a depth as indicated by the broken line 13a in Figure 2. One pair of slots coacts to receive a single winding. Angularly displaced from one slot 13 of each set is a smaller radial slot 15 of substantially lesser depth as indicated by the numeral 15a in Figure 2. This slot 15 coacts with the adjacent slot 13 to receive a smaller secondary winding or coil 16 which underlies the primary winding 14 as seen most clearly in Figure 2. The windings 14 and 16 are preferably covered with a synthetic enamel such as "Formex," for insulation purposes.

In making the stator core of the stator 11, a strip of magnetically responsive steel or electrical steel ribbon 17, as seen in Figure 1, of a type suitable for electro-magnetic devices, is pre-slotted, heat treated, and spirally wound or coiled. For defining the radial slots 13, notches 18 are punched in the steel ribbon 17 along one edge, while notches 19 are punched to define the radial slots 15. The ribbon is punched by any suitable means, such as an automatic machine in such a way that the spacing between the slots gradually increases from the inner end of the ribbon to the outer end to account for the variation in the spirally wound stator, and therefor results in having the proper notches 18 coaligned with each other and the proper notches 19 coaligned with each other to provide the radial slots 13 and 15 in the spirally wound ribbon. As pictured in Fig. 3, the inner end of the ribbon may be tapered and the outer end may be tapered to provide smoother inner and outer surfaces. Further, it will be seen that the distance between the first precut slots 18, as indicated by the letters A is smaller than the distance between the second sets of slots 18 and indicated at B, the latter constituting the second layer or coil in the stator.

In the notching or punching operation of the steel ribbon 17, some of the magnetizing properties of the ribbon are lost. To recover these magnetizing properties, the ribbon is heat treated by normalizing before spirally winding the ribbon to form the completed stator core. An important advantage is accrued in heat treating the ribbon before the winding operation in the oxide, which forms on the stator core when heat treating after the winding operation, is eliminated. After the steel ribbon has been heat treated, it is spirally wound to form the stator core with the notches aligning to define radial winding receiving slots. Then the primary and secondary windings 14 and 15 are mounted on the stator core to define the completed stator of the induction motor.

The housing 10 is then molded around the completed stator, wherein the housing more or less takes a cylindrical shape. Preferably, the material used in constructing the housing will be a plastic, although other suitable molding materials may be employed. It will be understood that the enamel insulation on the windings 14 and 16 is capable of withstanding the molding temperature without deteriorating or breaking down. The stator will be locked to the outer housing shell by virtue of the fact that in the molding process, the portion of the radial slots below the windings will be filled with the molding material and integrally connected with the outer shell, as well as being connected to an internally formed ring portion 20.

The housing 10 includes an outer stepped cylindrical shell 21 open at one end and encircling the stator 11. One end of the housing is closed by an annular end wall 22 which abuts against one end of the stator 11 and is integrally connected with a vertical cylindrical wall 23 extending downwardly along the inside of the stator 11 to the top of the winding 14. A second end wall 24 parallel to the end wall 22 closes the opening at the end of the housing and is integrally formed with the bottom edge of the vertical wall 23. Further, the end wall 24 is suitably bossed and apertured to receive in journal relationship a reduced end portion of an impeller-rotor shaft 25 extending axially through the housing 10. At the open end of the housing shell 21, a portion of the shell extends away from the corresponding end of the stator 11 and has formed therein and substantially sized at the outer periphery of the stator a counterbore 26 which freely receives the upper end of the impeller-rotor 12, the latter being suitably secured to the impeller-rotor shaft 25. The lower half of the impeller-rotor extends into a volute pumping chamber 27 adjacent the bore 26. A radial discharge port 28 extends through one wall of the shell in the vicinity of the volute pumping chamber 27 and will be connected to a receiving element.

A cover member 29 of the disk shape is secured over the open end of the shell 21 by suitable fasteners 30 and is provided with a central concave-convex portion having an aperture therein for receiving in journal relationship the other reduced end portion of the impeller-rotor shaft 25. The cover member 29 is also molded of the same plastic material used in molding the housing 10. An annularly arranged series of openings 31, each provided with a filter 32, such as fine mesh screen, are provided to serve as inlets to the pumping chamber 27.

The impeller-rotor 12 may be constructed in any suitable manner from a ferrous material, such as being forged and machined from mild steel, sintered from a suitable grade of iron powder, or formed from cast steel. In each case, an aluminum squirrel cage 33 will be cast along one lateral side of the disk-shaped impeller-rotor to coact with the stator 11 and define the rotor of the motor. The squirrel cage 33 is shown more clearly in Figure 4. On the opposite face of the impeller-rotor, a plurality of radial vanes or blades 34 are formed by machining away particular areas to define the impeller-rotor 12, as seen most clearly in Figure 5. In forming the vanes 34 to define the centrifugal pump impeller portion of the impeller-rotor 12, inwardly converging faces 35 and 36 are formed between adjacent vanes 34, the intersection being closest to the inner radial end of the vanes. Thus, the impeller for the centrifugal pump and the rotor for the induction motor are formed on a single member to define the impeller-rotor 12.

Now it is seen in Figure 2 that the rotor face of the impeller-rotor 12 is separated from the bottom end of the stator 11 by a small axial air gap, but that no sealing diaphragm is employed between these members, thereby obviously permitting an extremely small mechanical clearance. Such a small clearance enhances the efficiency of an induction motor as well as allowing the fluid handled to be in full communication with the stator and rotor portion.

Inasmuch as the motor-pump unit of the present invention is intended to be employed in an immersed condition in the liquid to be handled, it is necessary to vent any vapor of the liquid which might be generated in the centrifugal pump during operation. To this end, a series of holes 37 are formed in the impeller-rotor 12 around the hub portion thereof which lead above to a chamber defined by the impeller-rotor shaft 25 and the inner wall of the stator 11. This annular chamber is in turn vented through the end wall 24 of the housing 10 by another series of holes 38 which are substantially in alignment with the holes 37 in the impeller-rotor.

In operation, as already above discussed, the motor-pump unit of the instant invention will, in most cases, be immersed in the liquid to be handled, wherein the liquid will enter the apertures 31 in the cover member 29 and be pumped through the pumping chamber 27 and to the outlet 28. The outlet 28, of course, will be connected to a line leading to the place desired to have the liquid delivered. Inasmuch as the windings of the motor are immersed in the liquid being handled, the windings may be designed to have a much higher current density, thereby resulting in a reduction of space requirements of the windings and a better magnetic circuit. Moreover, the electrical or magnetic pull between the rotor portion of the impeller-rotor 12 and the stator 11 substantially balances the hydraulic pull of the impeller portion of the impeller-rotor to more or less allow the impeller-rotor 12 and attached shaft 25 to float or to have a floating mounting. In other words, the hydraulic pull of the impeller-rotor balances against the magnetic pull between the stator and rotor so that the impeller-rotor can ride free in a floatingly manner thereby eliminating the necessity for providing a heavy bearing arrangement to support the shaft 25 and consequently reducing the size and weight of the unit. It is only necessary to mount the opposite reduced ends of the shaft 25 in the apertures formed in the plastic housing and cover member.

It will be understood that modifications and variations may be effected without departing from the scope of the novel concepts of the present invention, but it is understood that this application is to be limited only by the scope of the appended claims.

I claim as my invention:

1. In a motor-pump unit adapted to be immersed in and flooded with the fluid it handles, a hollow cylindrical stator composed of a spirally wound steel ribbon having radial slots in one end thereof, stator coils wound around the inner and outer periphery of said cylindrical stator and seated in said slots, a housing embracing the inner and outer periphery of said stator having an end wall spanning the hollow interior of the stator and an outer periphery extending beyond the stator to provide a pumping chamber beyond one end of the stator, an end cover for said housing defining an axial inlet to said pumping chamber, said housing having a peripheral outlet for said pumping chamber, a shaft journaled in said cover and said wall of the housing spanning the cylindrical stator, an impeller in said pumping chamber mounted on said shaft having one face closely axially spaced from said stator in unobstructed direct confronting relation therewith and an opposite face adjacent said cover, a squirrel cage on said one face of the rotor coacting with the stator to provide the rotor for an electric motor, a plurality of pumping vanes on the other face of the rotor adjacent the cover for discharging fluids from the axial inlet in the cover to the peripheral outlet in the housing, passages through the impeller venting the pumping chamber to the stator to place fluid handled by the unit in full communication with the stator, and means for venting vapor from the housing, whereby the magnetic pull between the rotor and stator may balance the hydraulic pull on the impeller vanes to freely journal the impeller in the housing and cover.

2. In a motor-pump unit adapted to be flooded with fluid being pumped which comprises a hollow cylindrical stator, a plastic housing snugly embracing the inner and outer periphery of the stator and having an end wall spanning the hollow interior of the stator and a side wall projected beyond the end of the stator opposite said end wall to define a pumping chamber adjacent the stator, an end cover for said housing closing said pumping chamber, said chamber having a fluid inlet and a fluid outlet, a shaft journaled in said spanning end wall of the housing and in said cover, a combination motor rotor and pump impeller mounted on said shaft in said pumping chamber having a squirrel cage on the face thereof adjacent the stator and pumping vanes on the face thereof adjacent the cover, said squirrel cage being in free unobstructed direct confronting relation with said stator, passages through the impeller venting the pumping chamber to the stator to place fluid handled by the unit in full communication with the stator, and the magnetic pull between the stator and the squirrel cage balancing the hydraulic pull between the pumping vanes and the fluid being pumped to ride the shaft in a floating manner in the housing and cover journals therefor.

3. In a motor-pump unit adapted to be immersed in and flooded with the fluid it handles, a motor stator, a housing embracing said stator and projecting therebeyond to define a pumping chamber at one end of the stator, said chamber having an inlet and an outlet, a combined pumping impeller and motor rotor in said pumping chamber journaled by said housing and having a first rotor face portion in close axial spaced relation to one end of the stator in unobstructed direct confronting relation therewith and an opposite face in the pumping chamber equipped with pumping vanes for flowing fluid from the inlet to the outlet, passages connecting the pumping chamber with the stator to place the stator in full communication with the fluid being pumped for enhancing the cooling and efficiency of the motor portion of the unit, and means for venting vapor from the unit to prevent the pump from becoming gas bound.

References Cited in the file of this patent

UNITED STATES PATENTS

| 2,418,221 | Curtis | Apr. 1, 1947 |
| 2,438,629 | Anderson | Mar. 30, 1948 |
| 2,522,238 | Schild et al. | Sept. 12, 1950 |
| 2,588,173 | Somerville | Mar. 4, 1952 |
| 2,644,635 | Warrick et al. | July 7, 1953 |
| 2,689,396 | Vienneau | Sept. 21, 1954 |
| 2,693,149 | White | Nov. 2, 1954 |
| 2,700,343 | Pezzillo | Jan. 25, 1955 |
| 2,782,720 | Dochterman | Feb. 26, 1957 |

FOREIGN PATENTS

| 594,849 | Great Britain | Nov. 20, 1947 |